United States Patent Office 3,204,132
Patented Aug. 31, 1965

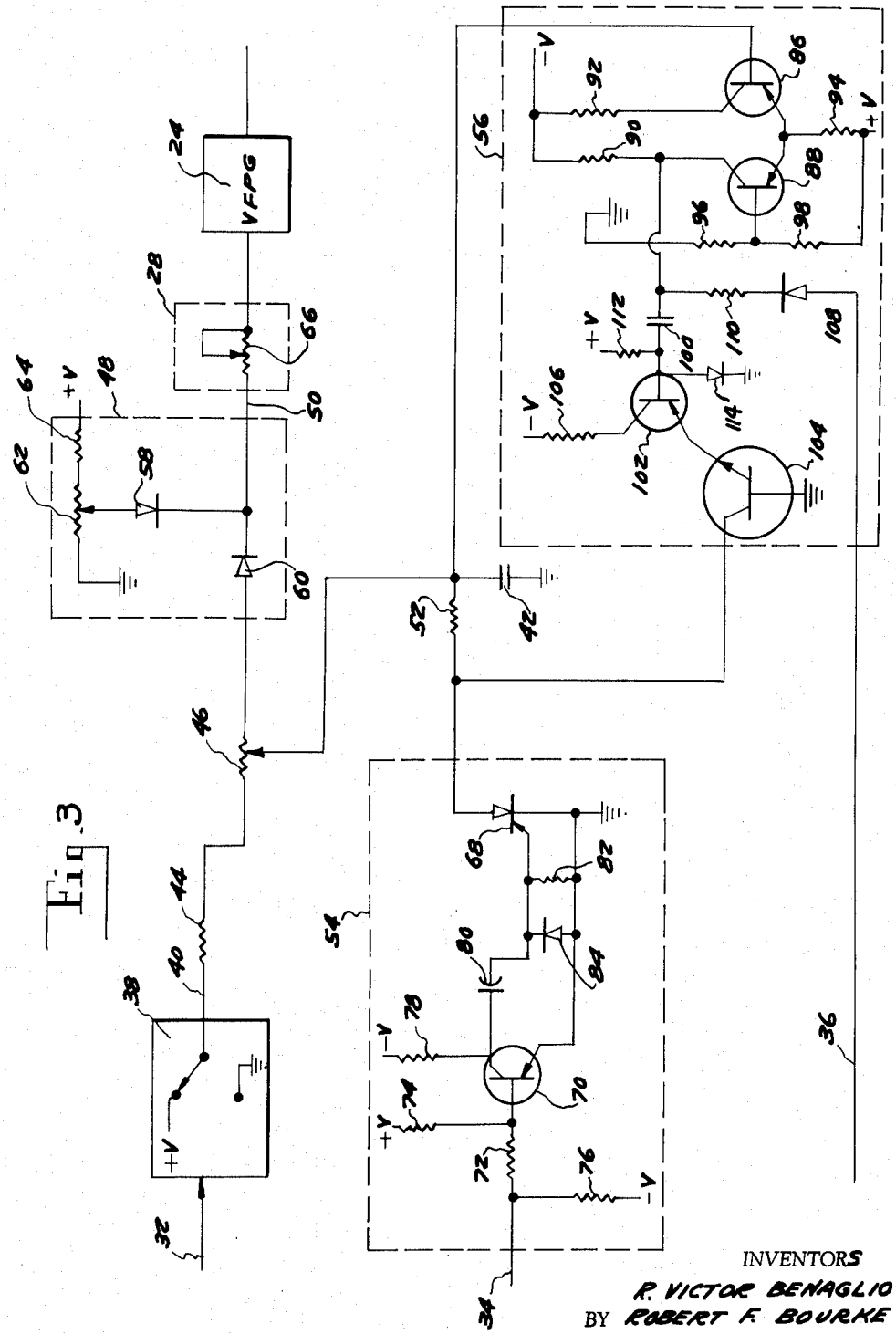

3,204,132
CONTOURING SYSTEM ACCELERATION-
DECELERATION CONTROL
Reno Victor Benaglio, Birmingham, and Robert F.
Bourke, Taylor, Mich., assignors to The Bendix Corporation, Detroit, Mich., a corporation of Delaware
Filed Feb. 7, 1962, Ser. No. 171,602
6 Claims. (Cl. 307—149)

This invention relates to digital numerically controlled positioning systems and more particularly to such a system which accelerates and decelerates its output device at controlled rates with a minimum of input information.

One class of contouring control systems accepts data in numerical form from a tape or other record medium and converts the numerical information into a plurality of pulse trains which are used in connection with servomechanisms to control the movement of a part along a plurality of axes simultaneously. Such a system is described in United States Patent Nos. 3,002,115 and 2,927,735. The numerical data causes the control to drive the part through a series of motion segments which are either a straight line or a basic curve such as a circle. The information contained on the tape for each of these motion segments includes coordinates of the end points of the segments and a number which is a function of the rate at which the output device is to move along the segment. This latter "feed rate number" may accompany each group of information relating to a particular motion segment, which group is known as a "block," or a single feed rate number may be provided for use in connection with a plurality of blocks, in which case the control system must calculate the rate at which each individual motion segment must be performed. In either case, the output motion rate experiences occasional rapid changes in velocity. For example, at the beginning of a series of motion segments, the control must quickly reach the programmed velocity, from an initial zero velocity; and at the end of this motion series the control must go to a zero velocity from the programmed velocity. In previous control systems, in order to minimize the velocity steps that the output device undergoes, it has been necessary to program a starting or stopping motion with a plurality of short motions of gradually increasing or decreasing velocity.

It is the primary object of the present invention to provide a positioning control system which automatically provides an essentially smooth velocity transition between sequential motion increments of differing velocity with a minimum of supplied numerical information.

In a preferred embodiment of the present invention, which will be subsequently described in detail, the tape is programmed so as to supply additional information signals to the system when a large velocity step is about to occur. This signal may take either of two forms; one for an acceleration and the other for a deceleration. By way of example, the block of information on a tape which is associated with the first motion increment of a series would carry information relating to the end coordinates of the first motion increment, a feed rate signal which is a function of the full motion rate that the output device will attain, and an acceleration signal. The control system will accept this information and initially command the output servomechanisms to move the controlled device at a small part of the ultimate feed rate, such as 10% thereof. The control will then exponentially increase the output feed rate until the full commanded rate is attained. Similarly, the last block of information will contain a deceleration signal as well as a feed rate signal indicating the full motion rate. The control system will immediately begin to exponentially decelerate the output motion from the full motion rate to a small percentage of that rate. Acceleration and deceleration signals may also be provided between various motion increments of differing rates which may occur, for instance, when the output device must pass around a sharp corner.

The preferred embodiment of the present invention is disclosed in connection with a system wherein a generator provides a pulse train to a feed rate multiplier which has the feed rate number as its other input and which provides an output train of pulses to the controller section of the system. The ultimate output motion occurs at a rate which is a function of the frequency of the pulses in this latter pulse train. The pulse generator used in connection with the system is of the variable frequency variety and its output rate may be controlled as a function of its input current or voltage. In the absence of an acceleration or deceleration signal, a normal value control current is provided to the variable frequency pulse generator. When an acceleration block is received from the tape, a novel circuit provides a current to the variable pulse generator which is initially some small percentage of the normal current, and then exponentially increases the current until full current is attained. Similarly, when a deceleration signal is received from the tape, the circuit exponentially decreases the voltage provided to the variable pulse generator unit a small fixed percentage of the maximum current is attained.

The acceleration and deceleration circuitry of the preferred embodiment takes the form of a capacitor-resistor charge-discharge circuit. When an acceleration signal is received, the capacitor is shunted to ground so as to immediately discharge and is then allowed to charge to its full voltage value, which it does at an exponential rate. When a deceleration signal is received, the supply voltage is removed from the capacitor allowing it to discharge through the resistor. A clamp circuit disposed between the capacitor and the variable pulse generator provides a minimum current to the pulse generator when the current supplied by the R-C circuit passes below that minimum.

Other objects, advantages and applications of the present invention may be made apparent by the following detailed description of a preferred embodiment of the invention. The description makes reference to the accompanying drawings in which:

FIG. 3 is a partial block, partial schematic view of the circuitry of the acceleration-deceleration control.

Figure 1:
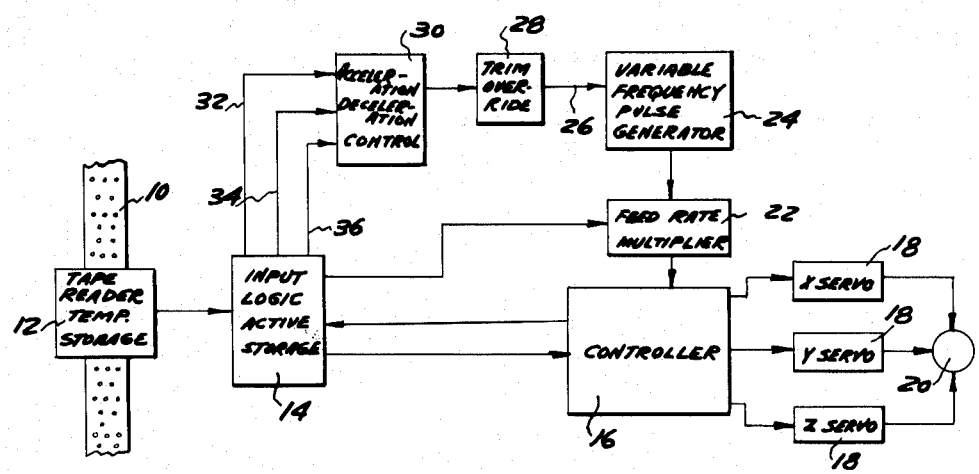
FIG. 1 is a block drawing of the entire control system including the acceleration-deceleration control.

The control system illustrated in FIG. 1 is substantially similar to that disclosed in U.S. Patent No. 3,002,115 and embodies certain of the inventive concepts of that patent.

The system is controlled from a punched tape 10 which contains a plurality of blocks of information. A tape reader 12 converts the information of particular blocks to electrical form and stores the information until a signal from the controller unit 16 causes a transfer of the information to the active storage logic unit. Certain parts of the actively stored information in the input logic unit 14 are supplied to a controller 16 which provides output pulse trains to a plurality of servomechanism units 18. The servomechanisms 18 accept the pulse trains and affect output motions of a controlled device 20. The servomechanisms move through distances proportional to the number of pulses in the trains they receive, at rates proportional to the rates of pulse occurrence in the trains. The driven device 20 is often the cutter and/or workholder of a machine tool.

In addition to the information from the input logic unit 14, the controller receives a pulse train from a feed rate multiplier 22. The frequency of this pulse train controls the rate of operation of the controller 16 and ultimately the velocity of the output device 20.

The feed rate multiplier has as inputs a pulse train from a variable frequency pulse generator 24 and a feed rate signal from the input logic unit 14, which latter signal is either encoded on the tape in connection with the block of information being utilized by the controller or is calculated by the input logic circuit from an overall feed rate number. The feed rate multiplier 22 essentially provides a uniform train of pulses to a controller 16. These pulses occur at a frequency which is a function of the frequency of the pulses received from the variable frequency pulse generator 24 and the number received from the input logic unit 14.

The output rate of the pulse generator 24 varies as does the controlling current which it receives from line 26. This current is determined by a trim-override unit 28 and an acceleration-deceleration control unit 30. The trim-override unit may be manually adjusted in a manner which will subsequently be described.

The acceleration-deceleration control 30 receives signals on three lines 32, 34 and 36 from the input logic unit. The line 32 carries signals commanding deceleration, the line 34 carries signals commanding acceleration, and the line 36 carries a "clear" signal which restores the circuitry to its initial condition at appropriate times in the control's operational cycle. This clear signal is used throughout the control to insure the establishment of initial conditions and it may be generated in a variety of manners which are familiar to those skilled in the art.

The function of the acceleration-deceleration control is to supply a constant current to the trim-override unit 28 and thus to the variable frequency pulse generator 24 in the absence of any acceleration or deceleration signals in the lines 32 and 34. When a deceleration signal is received, the unit 30 must exponentially decrease its current output from its normal value to a value which represents a small pre-set percentage of that normal value. When an acceleration signal is received, the unit 30 must supply an output current equal to that small pre-set percentage and then exponentially increase the output current to its full normal value. Of course, the tape is programmed so that acceleration and deceleration signals are never generated simultaneously.

The variations in current from the acceleration-deceleration control vary the frequency output of the pulse generator 24 so as to vary the output of the feed rate multiplier 22. The number fed to the feed rate multiplier 22 from the input logic unit 14 also varies the output of the multiplier.

Figure 2:
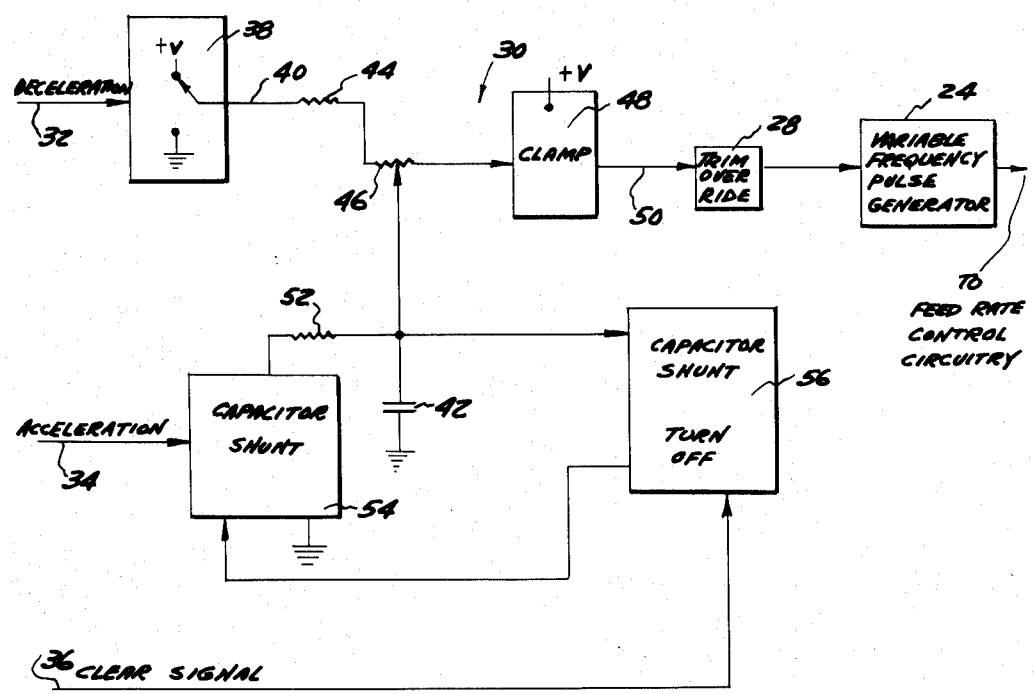
FIG. 2 is a block view of the acceleration-deceleration control of the present invention.

FIG. 2 discloses the nature of the acceleration-deceleration control 30 in block form. A transistor switch 38 acts to connect a line 40 either to a positive voltage supply or to ground. The switch is controlled by the line 32 which carries the deceleration signal from the input logic unit. In the absence of a signal on the line 32, the switch 38 connects the line 40 to the positive voltage. When the deceleration signal is received, the line 40 is switched to ground potential. Line 40 is connected to a capacitor 42 through a fixed resistor 44 and a potentiometer 46. The potentiometer 46 operates to adjust the time constant of the R-C circuit formed by the capacitor and the two resistors. The other end of the capacitor 42 is grounded.

The other fixed end of the potentiometer 46 is connected to a clamp circuit 48 which provides output on line 50. The output voltage on line 50 is normally that of the capacitor 42 unless that voltage decreases below a value previously set in the clamp circuit 48. This value is normally about 10% of the voltage of the positive source. The clamp operates to provide this minimum voltage on its output line 50 when the voltage of the capacitor 42 falls below the minimum. The line 50 connects to the trim-override unit 28, disclosed in FIG. 2, which feeds the variable frequency pulse generator 24.

The positive end of the capacitor 42 connects through a current limiting resistor 52 to a shunt unit 54 which is connected to ground. The shunt unit 54 acts as a switch to short the capacitor to ground when an acceleration signal is received on line 34. In the absence of an acceleration signal, the shunt unit is open.

The circuitry is completed by a capacitor shunt turnoff circuit 56 which senses the voltage of the capacitor 42 and opens the capacitor shunt 54 when the voltage of the capacitor 42 decays below a pre-set value. The capacitor shunt turnoff circuit 56 also receives the clear signal from line 36 to insure that the capacitor shunt is opened when the circuit must return to its initial condition.

The capacitor 42 is normally supplied with a positive voltage from the switch 38. This voltage is in excess of the setting of the clamp circuit 48 and is supplied to the subsequent circuitry through the line 50. When a deceleration signal is generated, the line 40 is switched to the ground potential and the voltage of the capacitor 42 exponentially decays to zero through the resistors 44 and 46. When the current thus supplied to the line 50 by the capacitor 42 decays below the clamp value, the clamp operates to supply the line 50. In this manner the frequency of the pulses provided by the generator 24 decays from a normal value to a lower pre-set value, which is a function of the setting of the clamp 48.

When an acceleration signal is received on line 34, the shunt 54 immediately discharges the capacitor 42 to ground through the very low resistor 52. However, when the voltage to the capacitor 42 decays below a low pre-set value, the capacitor shunt turnoff circuit 56 provides a signal to the shunt 54 which ungrounds the capacitor 42. This discharge of the capacitor occurs almost instantaneously upon the receipt of an acceleration signal. The capacitor 42 then begins to charge up to the positive voltage supply value at an exponential rate. While the voltage of the capacitor 42 is below the clamp value, that clamp current is provided on the line 50. As the voltage of the capacitor exponentially increases above the clamp value, the current resulting from that capacitor voltage is applied to the line 50. The current in line 50 thus increases exponentially to its normal value.

The specific form of certain novel aspects of the acceleration-deceleration control circuitry is disclosed in FIG. 3. The clamp circuit 48 simply comprises a pair of diode rectifiers 58 and 60 which are connected respectively to a potentiometer 62 and the potentiometer 46. The potentiometer 62 and the resistor 64, which are connected to the positive voltage supply, act as a voltage divider and provide the diode rectifier 58 with a voltage that is a function of the setting of the potentiometer 62. This potentiometer sets the voltage to the desired minimum and is connected by the line 50 to the trim-override unit 28 which simply comprises a potentiometer 66 with its variable point tied to one end. The trim-override unit 28 allows the operator of the control system to manually insert a multiplying factor in the motion rate control circuitry. It may be desirable to provide a pair of potentiometers in series, one of which acts as a trimmer to set to the maximum permissible pulse rate from the generator 24, and the other acts as a feed rate override.

The capacitor shunt circuit 54 is built about a controlled rectifier 68 which has its anode-cathode circuit connected between the resistor 52 and ground. Thus, when the controlled rectifier 68 fires, the capacitor 42 is shunted to ground. A controlled rectifier is used in the circuit rather than a transistor switch because of the superior current carrying capabilities of the controlled rectifier.

The gate circuit of the controlled rectifier includes a transistor 70 which has its base connected to the line 34 through a resistor 72. Another resistor pair, 74 and 76, stabilize and bias the transistor base circuit so that an acceleration signal in the line 34, which in the preferred embodiment takes the form of a negative pulse, causes a positive voltage step in the transistor's collector circuit. The transistor 70 thus acts as an inverter switch and converts the negative acceleration pulse to a positive pulse. A bias resistor 78 completes the collector circuit.

The positive step created in the collector circuit by the acceleration signal in the line 34 is differentiated by a capacitor 80 and fed to the gate of the controlled rectifier 68, causing it to fire. A resistor 82 in the controlled rectifier's cathode-gate circuit acts to stabilize the gate. A rectifier 84 which shunts the resistor 82 allows the controlled rectifier 68 to be quickly re-set.

The capacitor shunt turnoff circuit 56 operates to sense the voltage of the capacitor 42 and to turn off the controlled rectifier 68 when that voltage falls below a low pre-set value. The turnoff circuit 56 employs a pair of transistors 86 and 88 connected in a differential switching arrangement. The transistors 86 and 88 have their collectors connected to a negative voltage supply through a pair of resistors 90 and 92. Their emitters are connected to a positive voltage supply through a resistor 94. The base of the transistor 86 is connected directly to the positive side of the capacitor 42 while the base of the transistor 88 is supplied with a bias voltage by a pair of voltage dividing resistors 96 and 98. The arrangement is such that whichever of the transistors 86 or 88 has the most negative base is turned on.

The values of the voltage dividing resistors 96 and 98 are such that in the absence of an accelerating signal on the line 34, the voltage of the capacitor 42 is sufficient to maintain the transistor 86 in an "off" condition. When the capacitor voltage falls below a small percentage of that value as a result of the operation of the capacitor shunt 54, the transistor 86 is turned on and a negative voltage step is supplied to a capacitor 100 by the collector circuit of the transistor 88. The capacitor 100 differentiates this voltage step and provides a negative pulse to the base of a transistor 102. The collector of the transistor 102 is connected to a negative voltage supply so that the transistor acts to amplify the negative pulse received on its base and provides a stronger pulse to the emitter of a transistor 104. A current limiting resistor 106 connects the collector of the transistor 102 to a negative voltage supply. Resistor 112 serves to turn off transistor 102 at all times other than when the negative pulse is present from capacitor 100. Diode 114 serves to quickly discharge capacitor 100 when the voltage on capacitor 42 becomes more positive than the base of transistor 88.

The base of the transistor 104 is grounded so that when its emitter goes negative, its collector is brought to a voltage somewhere between ground value and the negative potential of the emitter. The collector is connected to the anode of controlled rectifier 68 and by bringing the anode to a negative value insures that the controlled rectifier is turned off.

Thus the capacitor shunt turnoff circuit 56 senses the voltage across the capacitor 42 and acts to provide a negative pulse to the controlled rectifier anode when the capacitor voltage decays below a pre-set value insuring the turning off of the controlled rectifier 68. The capacitor 42 may therefore immediately begin to recharge in an acceleration cycle.

The clear line 36 is connected through a rectifier 108 and a resistor 110 to the capacitor 100. In this manner it duplicates the negative pulse generated by the transistors 86 and 88 when a clear signal is received and insures that the controlled rectifier is turned off after the initial application of power to the control system.

Having thus described our invention, we claim:

1. In a numerical position control system having a record input, means for generating electrical representations of numerical information contained on the record, a variable frequency source of electrical pulses, a controller operative to receive pulses from the source and electrical representations from the tape and operative to generate a plurality of trains of electrical pulses for use by digital servomechanisms, the improvement which comprises the provision of circuitry operative to supply a frequency control signal to said variable frequency source of electrical pulses, said circuitry having a first, normal, condition wherein the pulse generator is caused to emit pulses of a constant frequency, a second, accelerating, condition wherein said pulse generator is caused to emit pulses at a continuously increasing frequency over a period of time, and a third, decelerating, condition wherein said pulse generator is caused to emit pulses of a continuously decreasing frequency over a period of time, the condition of said circuitry being controlled by information contained on the record.

2. The structure of claim 1 wherein said circuitry comprises a resistor, a capacitor, a voltage source for charging said capacitor through said resistor, first switching means for disconnecting said capacitor from said voltage source in order to provide a decelerating condition, and second switching means for discharging said capacitor in order to provide an accelerating condition.

3. The structure of claim 1 wherein said circuitry comprises a resistor, a capacitor, a voltage source normally operative to maintain a charge on said capacitor; first switching means for disconnecting said capacitor from said voltage source in order to create a decaying voltage output from said capacitor so as to cause the decelerating condition, a second switching means operative to discharge said capacitor preparatory to the initiation of an accelerating condition, and means connected within said circuitry and being operative to sense the voltage across the capacitor and to deactuate said second switching means at such time as the voltage decreases below a predetermined point.

4. A numerical control system, comprising, in combination: a record containing numerical information; means for accepting said record and creating electrical representations of various segments of information contained on said record; a source of electrical pulses controllable as to frequency; a controller operative to receive pulses from said source and information from said record and to simultaneously generate a plurality of pulse trains of varying frequencies; and a control circuit connected to said pulse generator having a first, normal, state wherein it causes said pulse generator to emit pulses of a constant frequency, a second, decelerating, state wherein it causes said pulse generator to emit pulses of a continuously creasing frequency, and a third, decelerating, state wherein it causes said pulse generator to emit pulses of a continuously increasing frequency; and means, responsive to information contained on said record for switching said control circuitry into its second or third states from its normal state.

5. A system in accordance with claim 4 wherein said variable frequency pulse source is voltage controlled and said control circuitry for said pulse source includes a capacitor, a resistor, a voltage source operative to charge said capacitor through said resistor, first switching means responsive to information contained on the record for disconnecting said capacitor from said voltage source, and second means controlled by information on the record for momentarily discharging said capacitor.

6. The structure of claim 5 wherein said means for momentarily discharging said capacitor comprises a controlled rectifier having its anode-cathode circuit shunting said capacitor, and having a trigger circuit circuitry connecting the record to the trigger circuit of said controlled rectifier so as to cause said controlled rectifier to fire upon the receipt of a particular signal from said record, and means for turning off said controlled rectifier when the voltage across the capacitor decreases below a predetermined value.

References Cited by the Examiner

UNITED STATES PATENTS 2,408,711  10/46  Volz _____ 340—262
2,833,941  5/58  Rosenberg _____ 318—162

LLOYD McCOLLUM, *Primary Examiner.*